G. H. Mallory,
Sawing Shingles,
N°22,083. Patented Nov. 16, 1858.
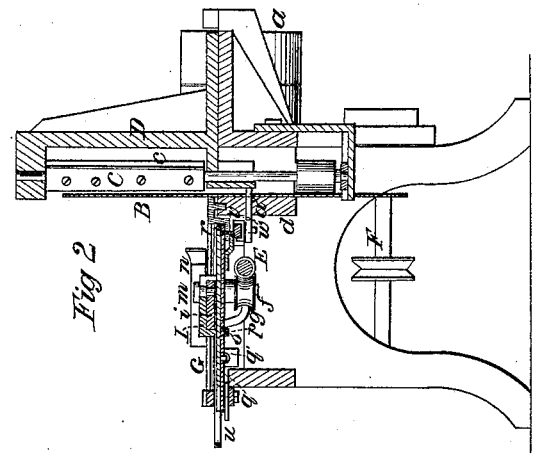
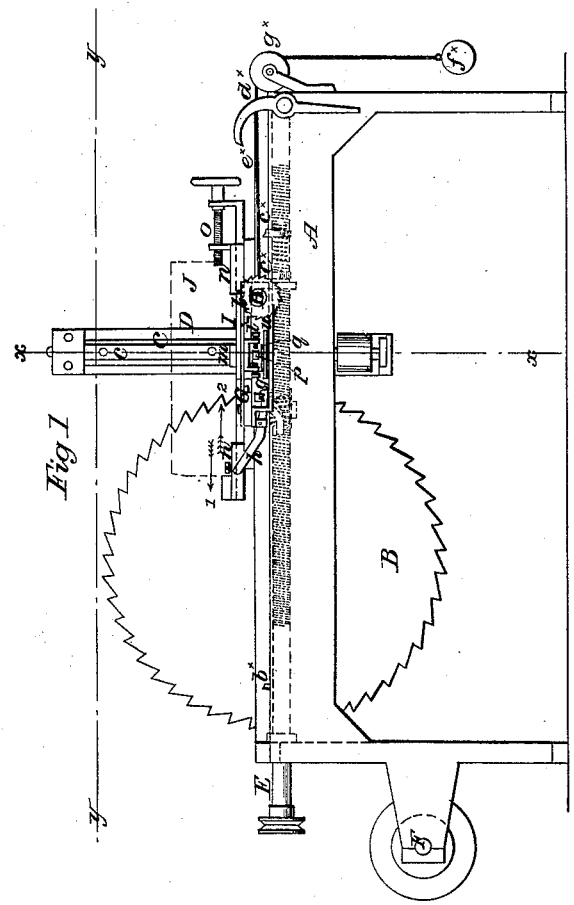
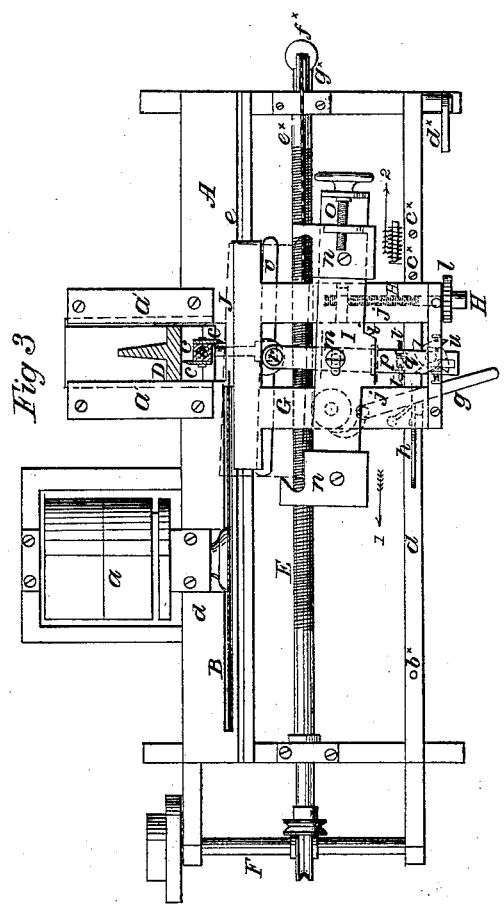

UNITED STATES PATENT OFFICE.

GEO. H. MALLORY, OF NEW YORK, N. Y.

MACHINE FOR SAWING AND PLANING SHINGLES.

Specification of Letters Patent No. 22,083, dated November 16, 1858.

*To all whom it may concern:*

Be it known that I, GEORGE H. MALLORY, of the city, county, and State of New York, have invented a new and Improved Shingle-Machine; and I do hereby declare that the following is a full, clear, and exact description of the same, reference being had to the annexed drawings, making a part of this specification, in which—

Figure 1, is a side view of my invention. Fig. 2, is a transverse vertical section of do. Fig. 3, is a horizontal section of do., taken in the line $y, y$, Fig. 1.

Similar letters of reference indicate corresponding parts in the several figures.

This invention relates to an improvement in that class of shingle machines in which the shingles are sawed from the bolt and planed at one and the same operation.

The invention consists in the peculiar arrangement of means employed for presenting the bolt to the saw so that the shingles may be sawed from the bolt in proper taper form, in combination with a peculiar means for operating a rotary planer so that the same while at work may be fed toward the shingle to compensate for its necessary oblique position, while being sawed from the bolt.

To enable those skilled in the art to fully understand and construct my invention I will proceed to describe it.

A, represents a frame which may be constructed in any proper way to support the working parts.

B, is a circular saw, which is placed in the upper part of the framing at one side, and having a driving pulley $a$, on the outer part of its arbor.

C, is a vertical rotary planer, fitted in a head D, which head is allowed to slide in a direction transverse with the frame A, or at right angles to the plane of rotation of the saw B, the bottom plate of the head being fitted between suitable guides $a'$, $a'$, attached to the frame A, see more particularly Fig. 3. The planer C, is simply a vertical arbor $b$, having two knives $c, c$, attached to it at opposite sides.

E, is a screw shaft which is fitted longitudinally in the frame A, at its upper part and parallel with its side pieces $d, d$. This screw shaft is allowed to rotate in its bearings and is driven by a belt from a driving shaft F, from which the saw mandrel is also driven as well as the rotary planer C.

On the upper part of the frame A, a carriage G, is placed, said carriage being fitted in a guide $e$, one or more, on the frame A, at one side, see Fig. 3. The carriage G, has a worm wheel $f$, attached to its under side, said wheel gearing into the screw shaft E. The wheel $f$, may be allowed to rotate or may be kept stationary by a pawl $g$, attached to the under side of the carriage. The pawl $g$, may when necessary be kept engaged with the wheel $f$, by a catch $h$.

In the carriage G, there is placed a slide $i$, which is fitted between guides $j, j$, the slide moving in a direction transverse with the plane of rotation of the saw B. To the under side of the slide $i$, a nut $k$, is attached, and through the nut $k$, a screw H, passes, said screw having a ratchet $l$, on its outer end. To the upper surface of the slide $i$, a bar I, is attached by a bolt or pivot $m$, and on each end of the bar I, a jaw $n$, is placed one of which may be adjusted by a set screw $o$. See Figs. 1 and 3. In the carriage two arms or bars $p, q$, are attached by a pivot $r$, said arms or bars being placed one over the other as shown clearly in Fig. 2. The upper bar $p$, is fitted between projecting or pendent lips $s$, attached to the bar I, and the bar $p$, has a pendent $q'$, attached to it, said pendent passing down through a slot in the lower bar $q$, and between set screws $t, t$, which pass through projections on the lower bar, see Fig. 3. To the outer part of the lower bar $q$, a wiper $u$, is attached by a pin, said wiper being attached to the carriage G. To the inner part of the lower arm or bar $q$, a bar $v$, is attached at right angles and this bar is fitted in a forked pin $w$, which is fitted in an arm $a^x$, attached to the lower part of the head D, of the planer C, see Fig. 2.

To one end of the frame A, and in the path of the catch $h$, a pin $b^x$, is attached, and to the opposite end two spring or yielding pins $c^x$, are attached, see Figs. 1 and 3. To the end of the frame A, near the pins $c^x, c^x$, a hooked or curved bar $d^x$ is attached. To one end of the carriage G, a rope $e^x$, is attached, said rope having a weight $f^x$, at its end, the rope passing over a pulley $g^x$, attached to the end of the framing.

The operation is as follows:—The bolt J, from which the shingles are cut is secured between the jaws $n, n,$ of the bar I, and a power is applied to the shaft F, in any proper manner. The carriage G, is fed along on the frame A, in the direction indicated by arrow 1, by the screw shaft E, and wheel $f$, the latter being held stationary by a pawl $g$. The saw B, cuts the shingle from the bolt J, and when the carriage has arrived at the end of the movement designated by arrow 1, the pin $b^x$, actuates the catch $h$, and the latter liberates the pawl $g$, which retains the wheel $f$, or prevents it from turning. The wheel $f$, being relieved from the pawl $g$, the weight $f$, draws the carriage back in the direction indicated by arrow 2, to its original position, and just before the carriage reaches the end of the latter movement the pins $c^x$, $c^x$, actuate the wiper $u$, and the bar $q$, and cross bar $v$, which is attached to it is moved so that the latter bar $v$, will have a relative oblique position with the sides $e$, $e$, of the frame and thereby draw the planer C, toward the shingle as the latter is cut from the bolt, this latter movement of the planer compensating for the oblique position of the bolt which is given it by the bar $p$, the latter actuating the bar I, in consequence of the pendent lips $s$, of said bar projecting down each side of the bar $p$. The upper bar $p$, however is not moved as much as the lower bar $q$, as the set screws $t$, $t$, are so adjusted as to permit a certain degree of movement of the bar $q$, before the upper one $p$, is moved. This arrangement of the set screws $t$, $t$, and pendent $q'$, is necessary as the bar I, and bolt J, are vibrated centrally, or from the center and consequently the bar $p$, requires to be turned or moved only one half the distance of the bar $q$, in order that the obliquity of the bolt and bar $v$, may correspond. The planer C, planes the side of the shingle as the same is sawed from the bolt, and the bolt at the termination of the carriage G in the direction of arrow 2, is fed bodily toward the saw in consequence of the ratchet $l$, of the screw H, being brought in contact with the curved bar $d^x$, the screw H, actuating the slide $i$, and consequently the bar I and bolt J. The bars I, $v$, it will be understood are placed consecutively in reverse positions at the terminations of the movement of the carriage G, in the direction of arrow 2, so that the shingles will be sawed from the bolt with their butts alternately from either end.

I am aware that circular saws and rotary planers have been previously used for sawing and planing shingles and I therefore do not claim broadly and separately said devices; but,

Having thus described my invention, what I claim as new and desire to secure by Letters Patent, is,

The particular means employed for adjusting the bolt J, to the saw in order to give the taper form to the shingles in combination with the means employed for adjusting or moving the planer C, to its work, to wit:—the bars $p$, $q$, connected as shown by the pendent $q'$, and set screws $t$, $t$, operated by the wiper $u$, and pins $c^x$, $c^x$, and attached respectively to the bar I, containing the jaws $n$, $n$, which hold the bolt J, and the bar $v$, connected with the planer head D, the whole being arranged to operate as and for the purpose set forth.

G. H. MALLORY.

Witnesses:
 W<small>M</small>. T<small>USCH</small>,
 W. H<small>AUFF</small>.